March 5, 1946.  H. GOLDBERG  2,395,966
PLAN POSITION INDICATOR SYSTEM
Filed Jan. 21, 1943  5 Sheets-Sheet 1

INVENTOR.
HAROLD GOLDBERG
BY D. Clyde Jones
ATTORNEY

March 5, 1946.　　　　H. GOLDBERG　　　　2,395,966
PLAN POSITION INDICATOR SYSTEM
Filed Jan. 21, 1943　　　5 Sheets-Sheet 2

INVENTOR.
HAROLD GOLDBERG
BY
Winfred T. Powell
ATT'Y.

March 5, 1946. H. GOLDBERG 2,395,966
PLAN POSITION INDICATOR SYSTEM
Filed Jan. 21, 1943 5 Sheets-Sheet 4
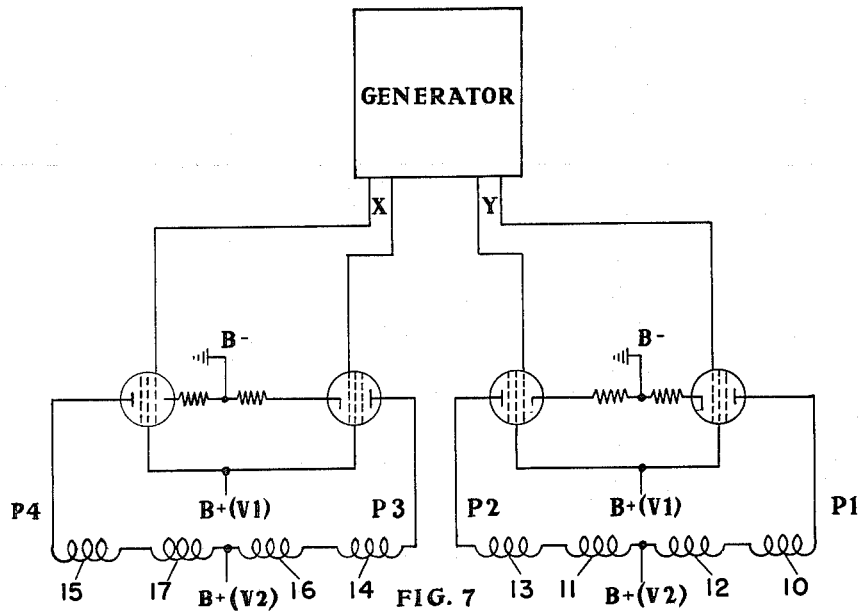
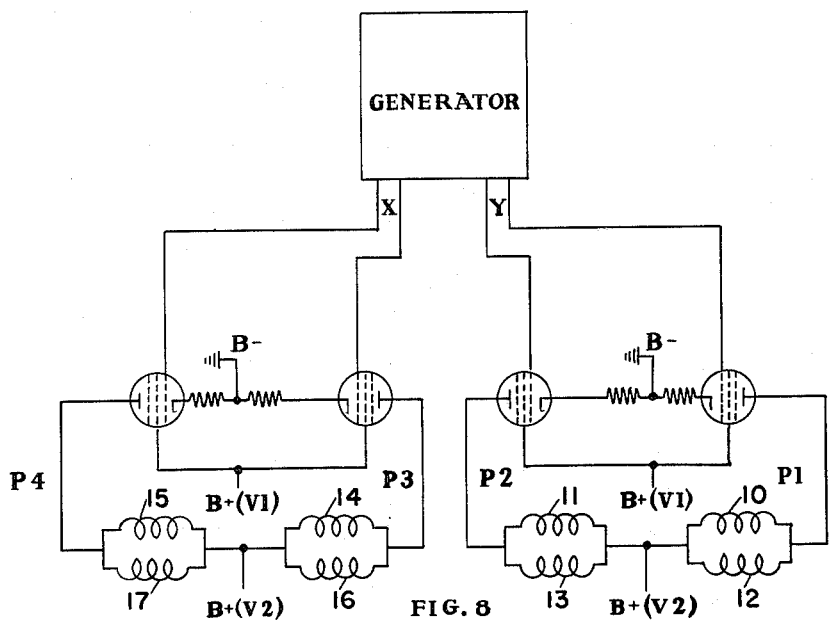
*INVENTOR.*
HAROLD GOLDBERG
BY Winfred T. Powell
ATT'Y.

*INVENTOR.*
HAROLD GOLDBERG
BY
Winfred T. Powell
ATT'Y.

Patented Mar. 5, 1946

2,395,966

UNITED STATES PATENT OFFICE 2,395,966

PLAN POSITION INDICATOR SYSTEM

Harold Goldberg, Irondequoit, N. Y., assignor to The Stromberg-Carlson Telephone Manufacturing Company, Rochester, N. Y., a corporation of New York Application January 21, 1943, Serial No. 473,073

8 Claims. (Cl. 315—24)

This invention relates to a plan position indicator providing a polar map giving azimuth and range of objects surrounding an observer at the origin of the polar map. The present invention is particularly applicable to an object detection and indication system which is operated by reflected pulses of radio frequency energy. In a system of object detection and indication of the radio pulse-echo type, a pulse of radio frequency energy is directively radiated. If the pulse strikes a reflecting object the pulse will be reflected and on return to a suitable receiver, including for example a cathode ray tube, will give rise to observable effects.

Such a system is more specifically applicable to the detection and indication of the location and distance from an observer of distant airplanes, ships, cities, coastlines, etc., serving likewise to map high points, valleys and the like.

In general, the cathode ray tube circuit includes a sweep voltage which moves the ray or beam over a scale in synchronism with the pulse transmission. The radio frequency pulses are directively radiated from a directional transmitting antenna coincident with the deflection of the cathode ray tube beam in a radial direction from the center of the tube face or some fixed circle concentric with the center point.

The cathode ray tube face is preferably divided and labeled in degrees and distances, means being provided and operable at the instant of initiation of propagation of the radio frequency pulses to cause the cathode ray tube to operate by movement of the beam over the face of the tube to time the interval elapsing between the time of transmission and the time of reception of the reflected wave, the extent of movement of the beam over the tube face during such interval being a measure of the desired distance, the tube face being calibrated, or suitable marking signals being provided, to directly indicate such distance. The beam intensity is modulated by the return pulse-echo and consequently the intensity of the resulting beam spot on the tube face is varied or modulated.

By this method, and by transmitting a series of radio-frequency pulses, areas of luminescence are produced on the cathode ray tube face corresponding to the location of objects in the path of the radio frequency energy radiated by the transmitting antenna, such areas being effectively produced by the echo-pulses picked up by the receiving antenna located close to the transmitting antenna, but so arranged and connected in the circuit that effective pickup of the transmitted pulses is prevented. Alternatively a single antenna may be used, with means provided for switching from the transmitter to the receiver.

By rotating the directional transmitting antenna through 360 degrees, causing the radial direction of the beam deflection to correspond one-to-one with the antenna rotation, the plan position indicating is achieved. Since the scanning or beam deflection is synchronized with the outgoing pulses and since the scanning is at a known rate, the distance from the transmitter to the reflecting object and back to the receiver may be determined and indicated on the cathode ray tube face in the above described manner and by means of transmitting and receiving circuits already known in the art.

An object of the present invention is to provide means whereby the radial direction of deflection of a cathode ray tube beam is caused to rotate, with the result that the beam spots over the enlarged end of the tube, due to the objects at given ranges, lie on circles concentric with the origin of the radial traces, the circle radius being a measure of the range.

Another object of my invention is the use of a cathode ray tube having beam deflecting coils to control the deflection of the electron beam by means having no mechanically moving parts.

Still a further object of my invention is the provision, in a cathode ray tube circuit of the magnetically deflected beam type, of means for producing the desired beam deflection in the radial direction corresponding one-to-one in radial direction in the position of the directive antenna.

The invention may be best understood by reading the following specification and considering it in connection with the drawings in which like reference characters represent like parts and in which:

Fig. 7 is a schematic circuit, including vacuum tubes and an indicated generator, of the series arrangement;

Fig. 8 is a schematic circuit, including tubes and an indicated generator, using the parallel arrangement;

Figs. 9A and 9B are graphs to be referred to in connection with Fig. 9;

Figure 1:
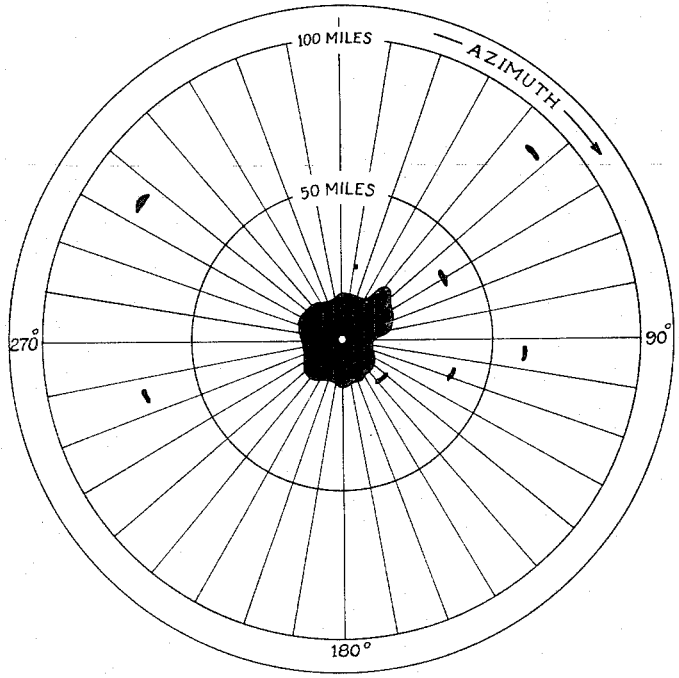
Fig. 1A is a plan view illustrating the cathode ray tube face and used for descriptive purposes.
Fig. 1B is a front elevation of the face of the cathode ray tube indicator, which affords continuous indication throughout its azimuth and within its distance range.
Figure 1:
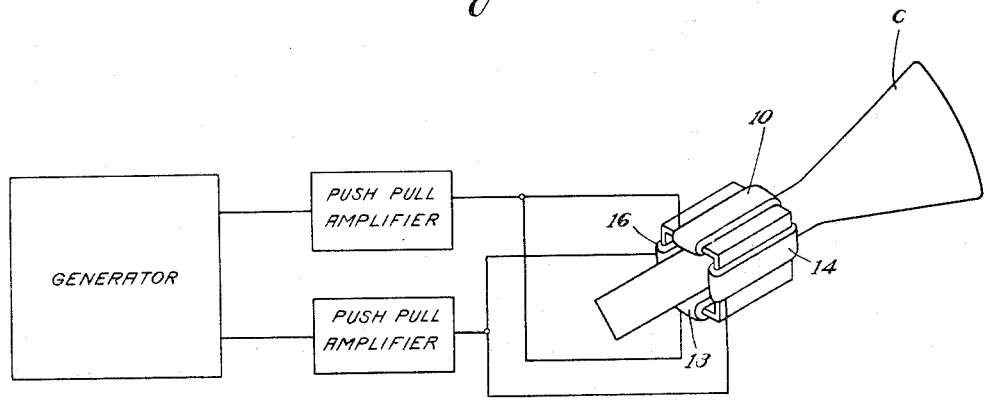
Figure 1A:
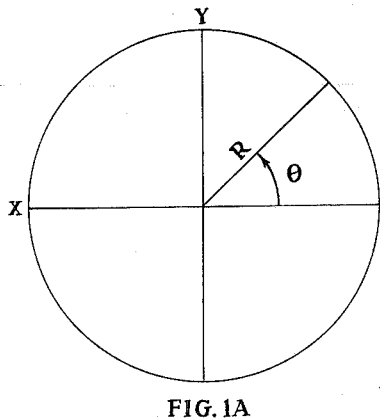
Figure 2A:
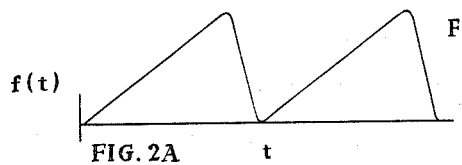
Figs. 2A and 2B are graphs descriptive of the operation of the invention.
Figure 2B:
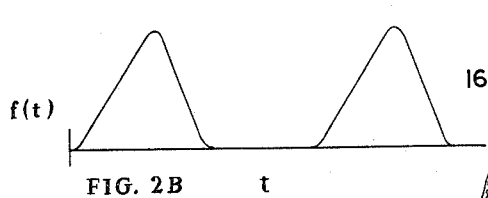

Refer to Figs. 1A, 2A, 2B and consider the control of the deflections of the electron beam in a cathode ray tube by means of the deviation or deflection coils. First, consider the face of a cathode ray tube, Fig. 1A, let $f(t)$ represent a function of time of the form shown in Figs. 2A and 2B, such form depending on the nature of the time representation desired. Although some other form $f(t)$ can be used, the following mathematical description is based on defining $f(t)$ so that it has no negative values but has zero values.

Let two fields be set up in the tube at right angles to each other, such as along X and Y axes, and let them have the amplitudes given by the following expressions where $\theta$ is the angle that a radial path of the electron beam or the generatrix R makes with the X axis; $B_y$ is the component of the flux along the Y axis; $B_x$ is the component of the flux, along the X axis.

$$B_y = f(t) a \sin \theta \quad (1)$$
$$B_x = f(t) a \cos \theta \quad (2)$$

It can be seen that as $\theta$ is varied, $$B_y^2 + B_x^2 = f(t)^2 a^2 \quad (3)$$

The deflections $D_y$ and $D_x$ of the electron beam are proportional to $B_y$ and $B_x$ respectively where $D_y$ is the deflection caused by the Y component of flux, $D_x$ is the deflection caused by the X component of the flux.

$$D_y = KB_y \quad (4)$$
$$D_x = KB_x \quad (5)$$

Hence, $$D_y^2 + D_x^2 = r^2 = f(t)^2 a^2 K^2 \quad (6)$$

or $$r = f(t) aK$$

where $r$ is the radial deflection of the electron beam (Fig. 1A). If angle $\theta$ is varied through 360 degrees, all values of $t$ for which $f(t)$ have the same value M lie on a circle of radius $MaK$.

If angle $\theta$ is fixed, the beam will describe a radial line R on the face of the cathode ray tube. As $\theta$ is varied, this line R will progressively advance around the intersection of the X and Y axes as a center, to radially scan the entire area of a given circular portion of the face of the tube. The radius of the circle will depend on the peak value of $f(t)$, $a$, and the deflection sensitivity of the tube. If angle $\theta$ is made to vary correspondingly with the angle of rotation of a rotating antenna, a one-to-one correspondence therebetween is achieved.

In orthogonal systems of deflecting coils, placed about the neck of the cathode ray tube, it is required to generate fields of the form $$B_y = f(t) a \sin \theta$$
$$B_x = f(t) a \cos \theta$$

where $\theta$ is the angle of rotation of the antenna.

If for some reason it is desired to start the deflection, not from the face center of the cathode ray tube, but from a circle of arbitrary radius, an additional set of orthogonal deflecting fields are supplied having the form $$B_x^1 = b \cos \theta \quad (7)$$
$$B_y^1 = b \sin \theta \quad (8)$$

$B_x^1$ is an additional component along the X axis, $B_y^1$ is an additional component along the Y axis and the resulting fields are $$B_y = [f(t)a + b] \sin \theta \quad (9)$$
$$B_x = [f(t)a + b] \cos \theta \quad (10)$$

It should be noted that setting $b=0$ gives the first case discussed.

Where orthogonal systems of deflecting coils are placed about the neck of the cathode ray tube, complete symmetry must be preserved between the two orthogonal systems. This is accomplished by making use of coils and magnetic circuits which are symmetrical with respect to the axis of the neck of the cathode ray tube. Coils, as at present used, cause difficulties which, as extensive investigations have shown, are due to inability of obtaining space symmetry in two orthogonal axes. Such coils are the saddle shaped deflection coils used in television, etc.

Another problem is the generation of currents in the deflection coils of the same form as the required fields and, since these currents are supplied by vacuum tube generators, the association of the coils with the driving tubes gives rise to other problems. One difficulty in this connection is that the steady plate current through the coils effects a constant deflection of the electron stream on which the variable deflection is superimposed. Attempts have been made to overcome this difficulty by balancing out the steady plate current component by non-inductive shunts in the output circuit, push-pull circuits and the like. Such expedients, however, lower the sensitivity and efficiency of the system.

It will now be explained how this problem has been solved in accordance with the present invention, by means of the coil structure shown in Figs. 3A and 3B connected in circuits as indicated in Fig. 7 or Fig. 8, making use of the other figures to explain the operation. The system makes use of balanced tube circuits and balanced deflection coil circuits.

Figure 3A:
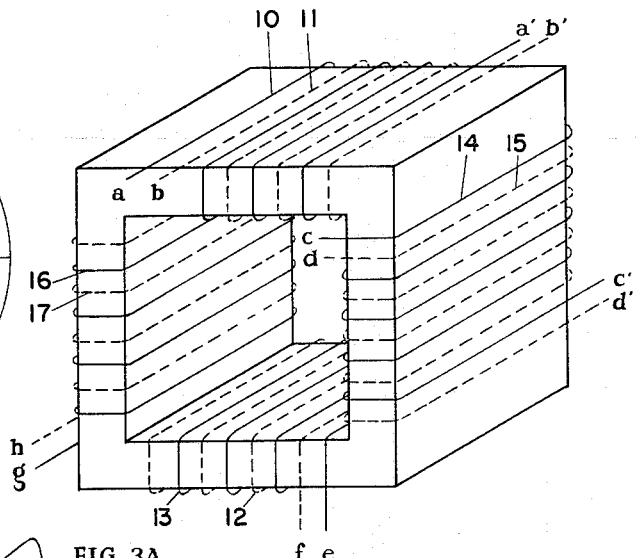
Fig. 3A is an isometric diagram of the deflection coil structure for controlling the deflection of the electron stream.
Figure 3B:
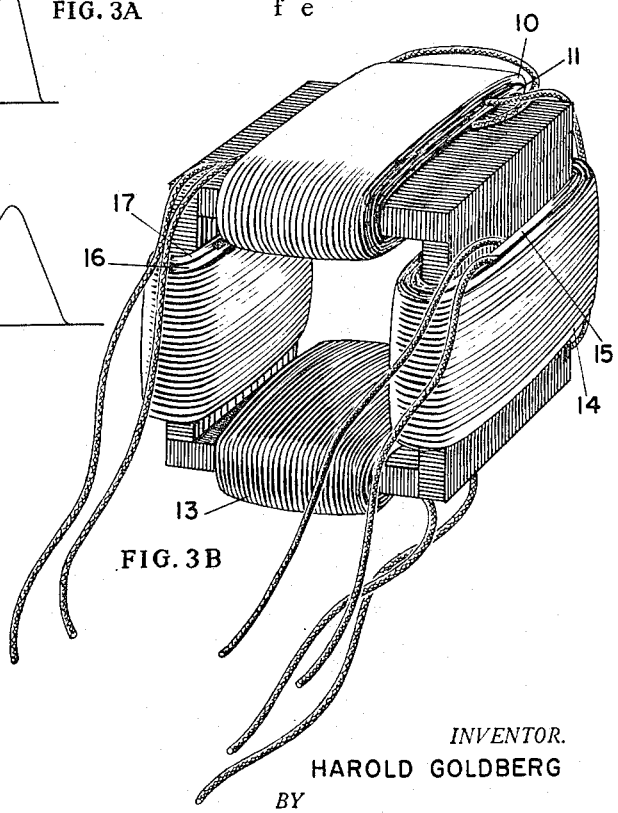
Fig. 3B is a perspective view of the deflection coil structure, showing the concentric arrangement of the windings on each leg of the core.
Figure 4:
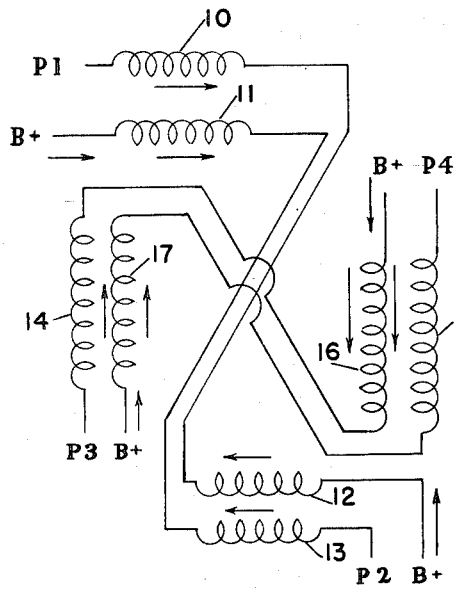
Fig. 4 is a schematic circuit diagram showing the coils of the coil structure connected in series.
Figure 6:
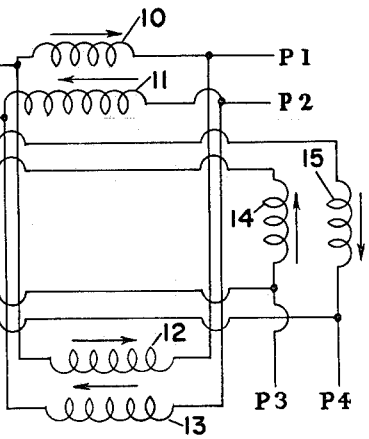
Fig. 6 is a schematic circuit diagram showing the coils of the coil structure connected in parallel.
Figure 5:
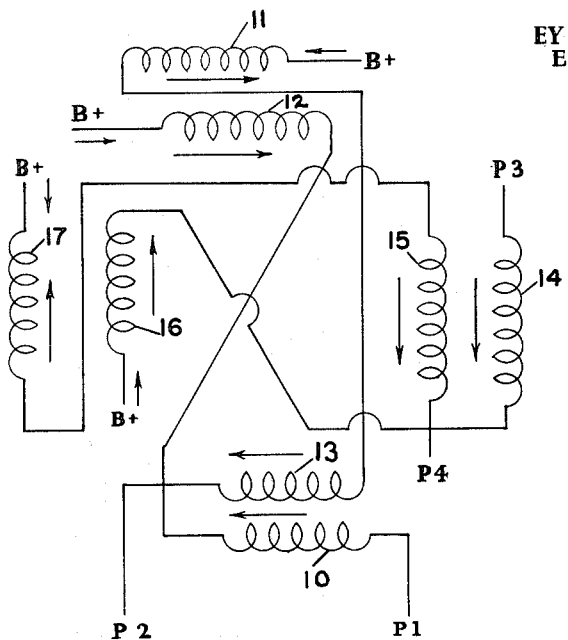
Fig. 5 is another schematic circuit diagram showing series connections of the coils of the coil structure.

The yoke is wound with eight coils having equal numbers of turns and arranged as four coaxial pairs as shown in Figs. 3A and 3B. These may be connected as shown in Fig. 4 or Fig. 5, which indicate coils connected in series or as shown in Fig. 6, which indicates coils connected in parallel. The arrows indicate the sense of the coil, considering fluxes as set up in the core. If current is in the direction indicated by the arrow, the flux is in arrow direction. If current is opposite to the arrow direction, the flux is opposite to arrow direction. The schematic circuit of the series arrangement is given in Fig. 7, while that of the parallel arrangement is shown in Fig. 8.

The two windings 10 and 11 on the upper leg of the coil core begin at $a$ and $b$ respectively and end at $a'$ and $b'$ respectively as shown in Fig. 3A and are concentrically wound as shown in Fig. 3B. Similar pairs of concentric windings are arranged on the other three core legs. Since all four sets of coils are symmetrical, equal steady state components of the currents in the amplifier tubes produce fields which cancel and produce no deflections. Any differences in the currents in pairs, however, result in a deflection. Thus, the variable components of the currents result in deflection. This scheme allows push-pull or balanced operation without the use of shunting resistors which reduce efficiency of deflection.

It will be apparent that any lack of symmetry due to the difference in diameters of the two concentric coils on a leg of the core will be compensated by connecting the inner coil of one leg to the outer coil of the opposite leg as indicated in Figs. 4, 5 and 6.

To get the required fields:
$$B_y = [f(t)a+b]\sin\theta \quad (11)$$
$$B_x = [f(t)a+b]\cos\theta \quad (12)$$

with these deflection coils, it is now possible to get the resultant fields with coil currents of the form $I_y'$ and $I_y''$ are the currents which will produce the flux $B_y$ when these currents flow through the vertical coils (Fig. 3B). $I_x'$ and $I_x''$ are the currents which will produce the flux $B_x$ when these currents flow through the horizontal coils (Fig. 3B):

$$I_y' = K[f(t)a+b]\sin\theta$$
$$I_y'' = -K[f(t)a+b]\sin\theta \quad (13)$$

$$I_x' = K[f(t)a+b]\cos\theta$$
$$I_x'' = -K[f(t)a+b]\cos\theta \quad (14)$$

or equally well by currents of form:

$$I_y' = K[f(t)a+b][c+\sin\theta]$$
$$I_y'' = K[f(t)a+b][c-\sin\theta] \quad (15)$$

$$I_x' = K[f(t)a+b][c+\cos\theta]$$
$$I_x'' = K[f(t)a+b][c-\cos\theta] \quad (16)$$

Figure 10:
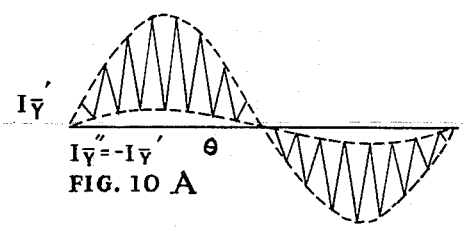
Figs. 10A and 10B are graphs respectively showing the wave forms corresponding to Equations 13 and 14 in the specification.
Figure 11:
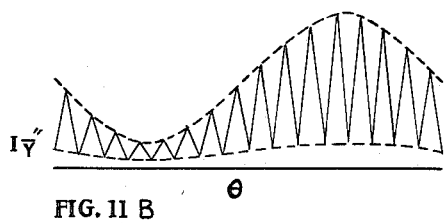
Figure 10:
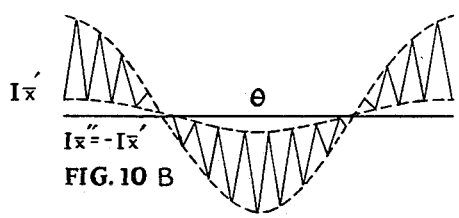
Figure 11:
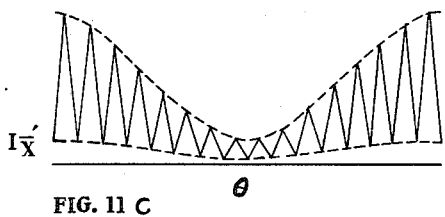
Figure 9:
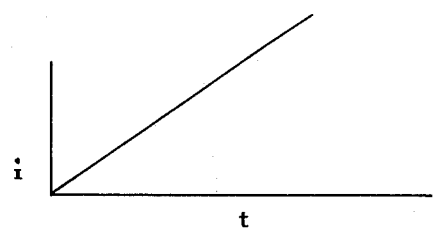
Figure 11:
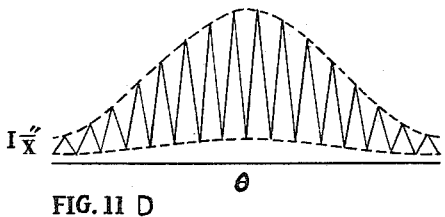
Figure 9:
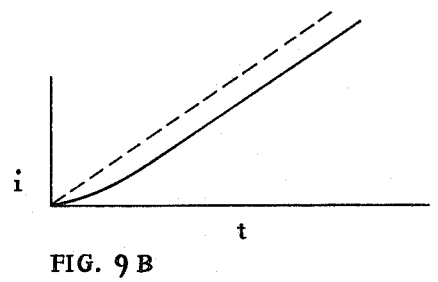

The wave forms corresponding to Equations 13 and 14 are shown in Fig. 10, while those corresponding to Equations 15 and 16 are given in Figs. 11A, 11B, 11C and 11D.

Although only two curves $I_y'$ and $I_x'$ are shown in Figs. 10A and 10B, it will be understood that the other two wave forms $I_y''$ and $I_x''$ are obtained as indicated in Equations 13 and 14, which other two wave forms are 180 degrees out of phase with $I_y'$ and $I_x'$ respectively (relative to $\theta$) as indicated by the expressions $I_y'' = -I_y'$ and $I_x'' = -I_x'$ in these figures.

Since the coils are arranged so that:
$$B_y \alpha (I_y' - I_y'') \quad (17)$$
$$B_x \alpha (I_x' - I_x'') \quad (18)$$

we have in the first case:
$$B_y \alpha 2K[f(t)a+b]\sin\theta$$
$$B_x \alpha 2K[f(t)a+b]\cos\theta \quad (19)$$

and in the second case:
$$B_y \alpha 2K[f(t)a+b]\sin\theta \quad (21)$$
$$B_x \alpha 2K[f(t)a+b]\cos\theta \quad (22)$$

both of which are the required form

Figure 9:
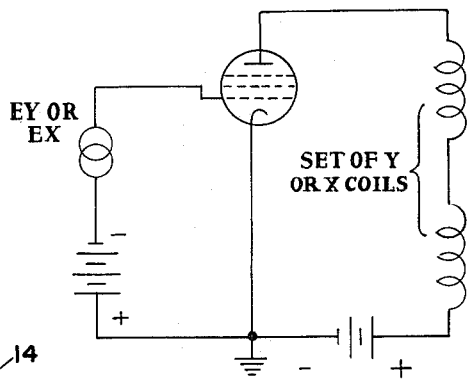
Fig. 9 is a schematic circuit which will be referred to for descriptive purposes in the specification.
Figure 11:
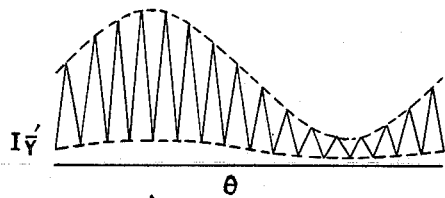
Figs. 11A, 11B, 11C and 11D are graphs respectively showing the wave forms corresponding to Equations 15 and 16 in the specification.

Since the form of the currents is established, it remains to see what is required of the amplifiers to supply these currents. Consider Fig. 9. If $e_g$ is as shown in Fig. 9A, then $i_p$ is as shown in Fig. 9B.

The time lag is a function of the effective plate resistance $R_p$. It is essential in compounding $B_y$ and $B_x$ that the time lags be identical to prevent distortion of the radial trace, and it is important in applications that the time lag be small to prevent errors in timing.

Both goals may be accomplished by the use of current degeneration. The simplest method is the use of un-bypassed cathode resistors in the cathode of the amplifier as indicated in Figs. 7 and 8. Still further reduction in time delay may be accomplished by suitable shaping of the input voltage and by the use of pentodes.

The use of cathode degeneration is essential to the proper compounding of the deflection fields. This degeneration accomplishes three important results. (1) It reduces non-linearity in tube characteristics. (2) It reduces time lag between grid voltage and deflection field. (3) It renders all four time lags relatively independent of tube constants and thus produces essentially equal time lags independent of tube operating conditions.

For the sake of brevity, it is believed unnecessary to show the internal construction or to describe the principle of operation of the cathode ray tube, since these tubes are widely used in various electrical systems and radio applications, there being several forms available. Furthermore, this invention relates to a method for producing radial scanning or beam deflection in a plan position indicator by the electro-magnetic method and in particular to an improved coil arrangement placed about the elongated neck of the cathode ray tube and means for generating currents in the coil windings for providing the magnetic field to give the required radial scanning, synchronized with the pulse-echo reception to provide indications on a polar map as illustrated in Fig. 1B. The irregular indication in black at the center of the polar map of Fig. 1B is shown to illustrate what might be observed at points near the observer, such as hills, valleys, lakes, buildings or the like. The small irregular spots on the map located at various distances from the center illustrate airplanes at various locations with respect to the observer assumed to be at the center point of the map. Or when scanning the horizon over a large body of water, these spots within a certain radius might indicate vessels on the surface of the water.

Referring to Figs. 7 and 8 and to the foregoing description, the operation of the circuit is as follows: The potentials of proper wave form supplied by the generator (vacuum tube type for example) are amplified by the balanced amplifier and applied to the deflecting coils 10 to 13 inclusive for the Y generator and coils 14 to 17 inclusive for the X generator to cause currents of proper form to flow in the coils.

The anode currents in the output circuits of the amplifier are effective to produce wave forms in the four sets of coils as illustrated in Figs. 11A, 11B, 11C and 11D for example. Since these four coil sets are displaced around the neck of the cathode ray tube, the fields combine to produce a rotating magnetic field which causes the cathode ray beam to execute a circular sweep at a rate determined by the frequency of the envelope curve shown in dotted lines. The high frequency pulses within the envelope illustrate the wave form of $f(t)$ and since thes pulses in the four sets of coils produce magnetic deflecting pulses which combine to provide a series of high frequency pulses in the magnetic field varying in amplitude from zero to a maximum, the beam is caused to execute a series of high frequency radial sweeps from the center of the tube face to its boundary limit.

Since the generator frequency is very high in comparison with the envelope frequency, the combined effect of these two executions is that the cathode ray beam sweeps around the face of the tube in a series of radial lines. Since these radial lines are very close together, since their rotation is in synchronism with the rotation of the beam antenna and since signalling pulses are sent out into space from the beam antenna at points properly related to the radial sweep high frequency pulses, it will be apparent that the variation in beam intensity, due to its modulation by a return pulse-echo (or a series of such echoes) will be manifested by shots of luminescence on the tube face polar map corresponding to the location and distance from the observer of the distant objects which causes the pulse-echoes.

It will also be understood that the proper relation between the antenna rotation and the generator pulses may be obtained by any proper means of synchronism, such for example, as driving the tuning condensers or other variable elements of the generator by the same motor which drives the beam antenna.

While there has been described, what is at present considered to be a preferred embodiment of this invention, it will be obvious to those skilled in the art that various changes and modifications may be made therein without departing from the invention and it is, therefore, desired in the appended claims to cover all such changes and modifications as fall within the true spirit and scope of the invention.

What is claimed is:

1. In an indicating system, a cathode ray beam tube, a symmetrical magnetic circuit enclosing the neck of the tube, sets of coaxially wound beam deflecting coils encircling said magnetic circuit at symmetrically spaced points thereon, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

2. In an indicating system, a cathode ray beam tube, sets of coaxially wound beam deflecting coils symmetrically located about the neck of said tube in a position to swing said beam with respect to the axis of said tube, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

3. In an indicating system, a cathode ray beam tube, a rectangular magnetic core enclosing the neck of said tube, a pair of coaxially wound coils on each leg of the core, the pairs of coaxial coils on opposite legs being electrically connected together, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

4. In an indicating system, a cathode ray beam tube, a rectangular magnetic core enclosing the neck of said tube, a pair of coaxially wound coils on each leg of the core, the pairs of coaxial coils on opposite legs being electrically connected together in series, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

5. In an indicating system, a cathode ray beam tube, a rectangular magnetic core enclosing the neck of said tube, a pair of coaxially wound coils on each leg of the core, the pairs of coaxial coils on opposite legs being electrically connected together in parallel, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

6. In an indicating system, a cathode ray beam tube, four sets of coaxial deflecting coils, said coils being symmetrically arranged with the main axis thereof defining a rectangle extending around the neck of the tube, and means for applying to each set of coils a saw-tooth wave signal whose amplitude varies sinusoidally, the sinusoidal variation of the signal applied to one set of coils being displaced in phase by ninety degrees from the sinusoidal variation of the other signal.

7. In an indicating system of the type employing a cathode ray beam tube having two sets of coaxially wound deflecting coils, two sources of saw-tooth wave signals whose respective amplitudes vary sinusoidally, the sinusoidal variation of one signal being displaced in phase by ninety degrees from the sinusoidal variation of the other signal, a push-pull amplifier having its input connected to one source and its output electrically connected to one set of coils, a second push-pull amplifier having its input connected to the other signal source and its output electrically connected to the other set of coils, each push-pull amplifier including two electron tubes, each provided with a cathode, and means for effecting cathode degeneration in each amplifier.

8. In an indicating system of the type employing a cathode ray beam tube having two sets of coaxially wound deflecting coils, said coils being arranged around the neck of the tube with the main axis of said coils defining a rectangle extending around said tube neck, two sources of saw-tooth wave signals whose respective amplitudes vary sinusoidally, the sinusoidal variation of one signal being displaced in phase by ninety degrees from the sinusoidal variation of the other signal, a push-pull amplifier having its input connected to one source and its output electrically connected to one set of coils, a second push-pull amplifier having its input connected to the other signal source and its output electrically connected to the other set of coils, each push-pull amplifier including two electron tubes, each provided with a cathode, and means for effecting cathode degeneration in each amplifier.

HAROLD GOLDBERG.